US009386339B2

(12) United States Patent
Livesey (10) Patent No.: US 9,386,339 B2
(45) Date of Patent: Jul. 5, 2016

(54) TAGGING PRODUCT INFORMATION (75) Inventor: Carl Livesey, Wigan (GB)

(73) Assignee: VIAP LIMITED, Wigan (GB)

( * ) Notice: Subject to any disclaimer, the term of this patent is extended or adjusted under 35 U.S.C. 154(b) by 1002 days.

(21) Appl. No.: 12/999,724

(22) PCT Filed: Jun. 18, 2009

(86) PCT No.: PCT/GB2009/001518
§ 371 (c)(1),
(2), (4) Date: Feb. 25, 2011

(87) PCT Pub. No.: WO2009/153557
PCT Pub. Date: Dec. 23, 2009

(65) Prior Publication Data
US 2011/0157370 A1 Jun. 30, 2011

(30) Foreign Application Priority Data

Jun. 18, 2008 (GB) .................................... 0811140.3
May 1, 2009 (GB) .................................... 0907595.3

(51) Int. Cl.
H04N 5/225 (2006.01)
H04N 21/43 (2011.01)
G01S 3/786 (2006.01)
H04N 21/21 (2011.01)
H04N 21/23 (2011.01)
H04N 21/234 (2011.01)
H04N 21/2343 (2011.01)
H04N 21/472 (2011.01)
(Continued)

(52) U.S. Cl.
CPC .......... *H04N 21/4307* (2013.01); *G01S 3/7864* (2013.01); *H04N 21/21* (2013.01); *H04N 21/23* (2013.01); *H04N 21/23412* (2013.01); *H04N 21/234318* (2013.01); *H04N 21/4725* (2013.01); *H04N 21/47205* (2013.01); *H04N 21/8547* (2013.01)

(58) Field of Classification Search
USPC ......................................................... 348/169
See application file for complete search history.

(56) References Cited

U.S. PATENT DOCUMENTS

2002/0059604 A1    5/2002  Papagan et al.
2005/0093976 A1*   5/2005  Valleriano .......... H04N 1/32101
                                                          348/143
2005/0195292 A1    9/2005  McIntyre et al.
(Continued)

FOREIGN PATENT DOCUMENTS

EP    0982947 A2    3/2000
GB    2387052 A    10/2003
(Continued)

Primary Examiner — Richard Torrente
(74) Attorney, Agent, or Firm — Barlow, Josephs & Holmes, Ltd.

(57) ABSTRACT

A system for enabling the tagging of items appearing in a moving or paused image includes the use of an identification device on or within said item to be tagged. The method includes capturing moving image footage containing the image of said item to be tagged, detecting the presence and the position of the identification means within each frame of the moving image footage and hence determining the position of the item to be tagged in each frame of the moving image. By automatically determining the position of the identification device, a suitable tag can then be automatically associated with the item which has the identification device provided thereon or therein when saving or transmitting the moving image.

19 Claims, 5 Drawing Sheets (51) Int. Cl.
*H04N 21/4725* (2011.01)
*H04N 21/8547* (2011.01)

(56) References Cited

U.S. PATENT DOCUMENTS

| | | | |
|---|---|---|---|
| 2005/0200847 A1 | 9/2005 | Chen et al. | |
| 2006/0184960 A1 | 8/2006 | Horton et al. | |
| 2006/0224322 A1 | 10/2006 | Scott | |
| 2008/0012767 A1* | 1/2008 | Caliri | G01S 5/021 342/463 |
| 2008/0046956 A1 | 2/2008 | Kulas | |
| 2008/0106594 A1* | 5/2008 | Thrun | 348/39 |
| 2008/0143481 A1 | 6/2008 | Abraham et al. | |
| 2009/0160942 A1* | 6/2009 | Kuo | G01S 5/0018 348/169 |

FOREIGN PATENT DOCUMENTS

| | | |
|---|---|---|
| JP | 2003348424 A | 12/2003 |
| WO | 0031560 | 6/2000 |
| WO | 0193529 A1 | 12/2001 |

* cited by examiner

TAGGING PRODUCT INFORMATION

The present invention relates to providing product information in the form of tags on moving images and/or paused images.

In our co-pending international application no PCT/GB2008/000706, a method and system for providing product information to viewers is described. In the system a viewer is provided with additional information by means of one or more visually indicated and viewer selectable tags displayed alongside or over the moving image. If viewer selection of any one of the tags is detected, the moving image playback is paused and additional information relating to the selected tag is displayed over said paused or moving image. The additional information may include a purchase product option, allowing a viewer to directly order the corresponding product.

In order to provide such functionality, it is necessary to manually tag the moving images wherever the tagged items appear. This can be a laborious, time consuming and costly undertaking, particularly if there are a large number of items to be tagged or the tagged items appear in a large number of scenes.

It is therefore an object of the present invention to provide a system and method by which these problems may at least partially alleviated or overcome.

According to a first aspect of the present invention there is provided a method of enabling the tagging of items appearing in a moving or paused image comprising the steps of providing an identification device on or within said item to be tagged; capturing moving image footage containing the image of said item to be tagged; detecting the presence and the position of the identification means within each frame of the moving image footage and hence determining the position of the item to be tagged in each frame of the moving image.

By automatically determining the position of the identification device, a suitable tag can then be automatically associated with the item which has the identification device provided thereon or therein when saving or transmitting the moving image. As such, a significant proportion of the tagging process may be automated, thus saving time and cost.

By automating the process of identifying an identification device within the frame, the invention may be used for tagging items in either live or pre-recorded broadcasts, including but not limited to sports events, music events, civic events, dramas, films or other programs or reports, for the purpose of supplying statistics and or sponsors logos and or information/product information with in the said sport, event, program or report.

By automating the process of identifying an identification device within the frame, the invention may be applied to the previously mentioned process of tagging products within a moving image.

For the avoidance of doubt, as used herein the term moving image includes both 2D and 3D examples of: video footage, movie footage, television pictures, animation, computer generated images or the like. The moving images may be silent or may have an accompanying sound track. The moving images may comprise a digital moving image file in any suitable format (the format may be any standard format including, but not limited to, the standard formats used for DVD and Blu-Ray encoding), a moving image broadcast, a moving image streamed over the Internet or an analogue moving image record such as videotape or film reels.

The method may involve the additional step of determining a motion track for the item to be tagged. The tag may be applied to the motion track. The motion track may be displayed over the image. This can allow a human operator to verify its accuracy. In order to reduce false matches or identifications, the method may constrain identification only to positions adjacent to the position of the item in a previous frame. In the event that the motion track is incorrect, the operator may be able to adjust the motion track. The motion track may be adjusted by any suitable control input means including but not limited to: pointing devices such as mouse, trackball and touch pads, touch screen systems or similar.

During playback, the tag may be visible at all times that the item is on display, intermittently or in response to a viewer request.

There may be more than one identification device applied to a selected item. The or each identification device may be uniquely identifiable. In such circumstances, the or each identification device may be assigned to a particular item before image capture commences. This may allow information regarding the item to be automatically assigned to the tag applied to the item in the moving image.

The or each identification device may be recognised by colour, shape, pattern or any other detectable image property. The identification device may be a visually distinctive element or may be an element having a distinctive appearance in another region of the electromagnetic spectrum. The distinctive appearance may be used to identify the particular identification device. The distinctive appearance may not be apparent in the visible range of the spectrum but may be distinctive in say the infrared or ultraviolet ranges. The distinctive appearance may be a pattern or a relatively bright monochrome area. In particular, the detectable element may reflect and/or emit a visual, RF, infrared or ultraviolet signal. The signal may be substantially continuous or may be intermittent. If the signal is intermittent it may be used to identify a particular identification device and or to provide further information about the device, its position or its appearance. In RF, ultraviolet or infrared embodiments the means used to capture moving image may be equipped with means operable to detect electromagnetic radiation other than in the visual range. In particular the means used to capture moving image may be operable to capture the same image area in a different spectral range such that the position of the identification device within the captured image may be determined.

In some embodiments, the position of the identification device and hence the selected item within the image may be determined by use of a second image. The second image may be adapted to clearly show the distinctive elements of the identification device. The second image may be produced by a dedicated additional sensing array which may be provided separately to, adjacent to or interspersed with or incorporated with a conventional sensing array. The additional array may be subject to physical or digital filtering to enhance the clarity of the distinctive element or elements within the second image. Additionally or alternatively, the second image can be produced by digital filtering of the output of the conventional sensing array.

In the event that the identification device detracts from or is otherwise visible in the captured moving image after tagging is complete, suitable post production techniques may be applied to remove visible traces of the identification device from the finalised moving image.

In embodiments incorporating RF emitting identification devices two or more RF receivers may be provided to track the position of said identification device. If necessary, one or more RF booster or relay stations may also be provided. This may enable the devices to be recognized and located at a long range.

The position of the identification means within each frame of the moving image footage can be determined by a suitable processing unit. The processing unit may be in communication with each means used to capture moving image footage and to each tracking means.

The processing unit may be provided with user actuable controls. These may enable the user to select which of a possible plurality of identification devices are to be tagged in the moving images. The user controls may also enable the information associated with any tagging to be varied. In particular, the information may be retrieved from a dedicated database. Additionally or alternatively, the information may be generated by the processing unit.

According to a second aspect of the present invention there is provided a method of enabling the tagging of items appearing in a moving image comprising the steps of: providing an identification device on or within said item to be tagged; capturing moving image footage containing the image of said item to be tagged; determining the position of the means used to capture moving image footage; determining the position of the identification means; determining the relative position of the means used to capture moving image footage and the identification means and hence determining whether the item to be tagged is in a frame of the moving image and if so, its position within that frame.

The method of the second aspect of the present invention may incorporate any or all features of the method of the first aspect of the present invention as required or as desired.

The method may be used to determine the position of two or more identification devices at any one time. The method may be used to determine the position of two or more means used to capture moving image footage.

The position of the means used to capture moving image footage may be predetermined. Alternatively, the position of means used to capture moving image footage may be tracked. The orientation and/or inclination of the means used to capture moving image footage may additionally be predetermined or tracked. Tracking of the position of the means used to capture moving image footage may be achieved by fitting the means used to capture moving image footage with an identification device.

The position of the or each identification device may be determined by tracking means. The tracking means may be incorporated into the means used to capture moving image footage or may be provided separately. In a preferred embodiment, the tracking means may be provided at fixed predetermined locations in or around the area where moving image footage is to be captured.

The identification means may be operable to emit an RF signal that can be received by the tracking means. If more than one identification device is provided, each identification device may be provided with a unique identity code. The identification means may be adapted to be concealed in clothing or other equipment if desired.

In alternative embodiment, the identification device may be operable to receive external signals and transmit information relating thereto to the tracking device. In this manner, the identification device may be adapted to use an existing position determination system, such as GPS, to determine its own position or to provide sufficient information for the tracking device to determine its position.

The means used to capture moving image footage may be a camera. In particular this may be a digital or analogue movie or television camera. The means used to capture moving image footage may be provided with one or more sensors to determine its inclination, orientation and extent of its field of view.

The position of the identification means within each frame of the moving image footage may be determined by a suitable processing unit. The processing unit may be in communication with each means used to capture moving image footage and to each tracking means.

The processing unit may be provided with user actuable controls. These may enable the user to select which of a possible plurality of identification devices are to be tagged in the moving images. The user controls may also enable the information associated with any tagging to be varied. In particular, the information may be retrieved from a dedicated database. Additionally or alternatively, the information may be generated by the processing unit.

This method may in particular be applied to capturing footage of a sporting event taking place within a confined playing area. In such cases, one or more tracking means are positioned in or around the confined playing area. Additionally, one or more means for capturing moving image footage may be provided in or around the confined playing area.

According to a third aspect of the present invention there is provided a system suitable for enabling the tagging of items appearing in a moving or paused image and operable in accordance with the methods of either the first or second aspects of the present invention, the system comprising: means for capturing moving image footage containing the image of said item to be tagged; means for detecting the presence and the position of the identification means within each frame of the moving image footage and hence determining the position of the item to be tagged in each frame of the moving image.

The system of the third aspect of the present invention may incorporate any or all features of the first or second aspects of the present invention as desired or as appropriate.

In some embodiments, the position of the identification device and hence the selected item within the image may be determined by use of a second image. The second image may be adapted to clearly show the distinctive elements of the identification device. The second image may be produced by a dedicated additional sensing array which may be provided separately to, adjacent to or interspersed with or incorporated with a conventional sensing array. The additional array may be subject to physical or digital filtering to enhance the clarity of the distinctive element or elements within the second image. Additionally or alternatively, the second image can be produced by digital filtering of the output of the conventional sensing array.

The means for detecting the presence and the position of the identification means within each frame of the moving image footage may comprise means for determining the position of the means used to capture moving image footage; means for determining the position of the identification means; means for determining the relative position of the means used to capture moving image footage and the identification means and hence determining whether the item to be tagged is in a frame of the moving image and if so, its position within that frame.

The position of the means used to capture moving image footage may be predetermined. Alternatively, the position of means used to capture moving image footage may be tracked. The orientation and/or inclination of the means used to capture moving image footage may additionally be predetermined or tracked. Tracking of the position of the means used to capture moving image footage may be achieved by fitting the means used to capture moving image footage with an identification device.

The position of the or each identification device may, be determined by tracking means. The tracking means may be incorporated into the means used to capture moving image footage or may be provided separately. In a preferred embodiment, the tracking means may be provided at fixed predetermined locations in or around the area where moving image footage is to be captured.

The identification means may be operable to emit an RF signal that can be received by the tracking means. If more than one identification device is provided, each identification device may be provided with a unique identity code. The identification means may be adapted to be concealed in clothing or other equipment if desired.

In alternative embodiment, the identification device may be operable to receive external signals and transmit information relating thereto to the tracking device. In this manner, the identification device may be adapted to use an existing position determination system, such as GPS, to determine its own position or to provide sufficient information for the tracking device to determine its position.

The position of the identification means within each frame of the moving image footage may be determined by a suitable processing unit. The processing unit may be in communication with each means used to capture moving image footage and to each tracking means.

The processing unit may be provided with user actuable controls. These may enable the user to select which of a possible plurality of identification devices are to be tagged in the moving images. The user controls may also enable the information associated with any tagging to be varied. In particular, the information may be retrieved from a dedicated database. Additionally or alternatively, the information may be generated by the processing unit.

The system may further comprise means for displaying a captured moving image and indicating the presence of items that may be tagged in the displayed captured image; user actuable input means for enabling the selection and tagging of an indicated item; and object recognition means for tracking the motion path of the selected item from frame to frame.

According to a fourth aspect of the present invention there is provided an identification device suitable for use in the present invention comprising: attachment means for attaching the identification device to an item; and a distinctive element detectable by a suitably equipped moving image camera for identifying the identification device and enabling its position within a captured image to be determined.

The identification device of the fourth aspect of the present invention may incorporate any or all features of the first, second or third aspects of the present invention as desired or as appropriate.

The attachment means may comprise any suitable means including but not limited to: screw fasteners, pins, nails, clips, adhesives, adhesive tapes, hook and loop fabrics or similar. Additionally or alternatively the identification device may be placed on or within the item at the point of manufacture.

The distinctive element may be a visually distinctive element or may be an element having a distinctive appearance or signal in another region of the electromagnetic spectrum. The distinctive appearance or signal may be used to identify the particular identification device. The distinctive appearance or signal may not be apparent in the visible range of the spectrum. In the case of a distinctive appearance, the appearance may be a pattern or a relatively bright monochrome area. In the case of a distinctive signal, the signal may be a visual, RF, infrared or ultraviolet signal. The signal may be substantially continuous or may be intermittent. If the signal is intermittent it may be used to identify a particular identification device. In such instances the camera may be equipped with means operable to detect electromagnetic radiation other than in the visual range. In particular the camera may be operable to capture the same image area in a different spectral range such that the position of the identification device within the captured image may be determined.

The identification means may be operable to emit an RF signal that can be received by the tracking means. If more than one identification device is provided, each identification device may be provided with a unique identity code. The identification means may be adapted to be concealed in clothing or other equipment if desired.

In alternative embodiment, the identification device may be operable to receive external signals and transmit information relating thereto to the tracking device. In this manner, the identification device may be adapted to use an existing position determination system, such as GPS, to determine its own position or to provide sufficient information for the tracking device to determine its position.

According to a fifth aspect of the present invention there is provided a moving image camera suitable for use in the various aspects of the present invention comprising: image capture means for capturing a moving image; and identification means for detecting, identifying and locating an identification device in accordance with the fourth aspect of the present invention within the captured image.

The camera of the fifth aspect of the present invention may incorporate any or all features of the first, second, third or fourth aspects of the present invention as desired or as appropriate.

In embodiments where the position of the identification device and hence the selected item within the image is determined by use of a second image, the second image may be adapted to clearly show the distinctive elements of the identification device. The second image may be produced by a dedicated additional sensing array which may be provided separately to, adjacent to or interspersed with a conventional sensing array. The additional array may be subject to physical or digital filtering to enhance the clarity of the distinctive element or elements within the second image. Additionally or alternatively, the second image can be produced by physical or digital filtering of the output of the conventional sensing array.

In embodiments incorporating RF emitting identification devices, the camera may comprise two or more RF receivers to track the position of said identification device.

According to a sixth aspect of the present invention there is provided a method of providing additional information to a viewer of a moving image comprising the steps of: providing an identification device on or within said item to be tagged; capturing moving image footage containing the image of said item to be tagged; detecting the presence and the position of the identification means within each frame of the moving image footage and hence determining the position of the item to be tagged in each frame of the moving image; applying a tag to the determined position of the item; indicating the existence of said tags; detecting a request to view said information associated with said one or more tags; and displaying said requested information over said moving image.

By use of the above method, a viewer can easily tell when there is further information available and can readily access that information. The position of the tagged items in each shot may be determined by any suitable means or method. In particular, the method of the sixth aspect of the present invention may incorporate any or all features of any one of the first, second, third, fourth of fifth aspects of the present invention as desired or as appropriate.

The item to be tagged may be a participant in the event, a spectator at the event or any item used in or in conjunction with the event.

The visual indication of the existence of a tag may be automatic or may be in response to viewer action. The viewer action may be a selection of a tag visual indication display mode. The tag visual indication display mode may toggle between enabled and not enabled. Alternatively, the tag visual indication display mode may be enabled temporarily in response to viewer selection or request. In such cases, the mode may be enabled for a limited time period, say a few seconds, or for a duration dependent upon the image file, say until the end of a current scene. Additionally or alternatively, tag visual indication may be in response to viewer selection of a particular area of the displayed image. The area may be the area of the image wherein the associated product is displayed or may be another dedicated area of the image. The visual indication may be displayed for a limited time period, say a few seconds, or for a duration dependent upon the image file, say until the end of a current scene.

Additionally or alternatively, the tagged item may be visually highlighted within the image. This visual highlighting may be momentary, intermittent or constant as desired. In some implementations, this highlighting may take place in response to a viewer request.

Selection of tag visual indication display mode may provide the viewer with a list of tagged participants, spectators or items that may be selected. This may appear over, alongside or in place of the moving image. The list may be categorised, if desired.

The displayed information may be displayed in a window or dialog box provided over the moving image. The displayed information may contain any of the following: the identity of the participant, spectator, or item tagged; the identity, logo or other information of a sponsor associated therewith; statistical or other information relating to the past or present performance of a participant; one or more images of the participant, spectator, or item; and purchasing details for the any related products.

The displayed information may be provided at or in substantially the same position within the image as the participant, spectator or item. The information may only be displayed when the participant, spectator or item is visible in a shot. Additionally or alternatively, information may be displayed at a margin of the screen when the participant, spectator or item is not visible in a shot. In this manner, the method of the present invention may allow a viewer to track the movements of, for instance a player in a sporting event or locate a particular spectator known to the viewer whenever the player or spectator is in shot.

Viewer requests are preferably made using suitable control means. The control means may be any type of control means suitable for interfacing with the system used to play and/or display the image file. Such suitable types of control means may include control interfaces provided directly upon the system, keyboards or keypads connected to the system by any suitable wired or wireless link, cursor directing devices connected to the system by any suitable wired or wireless link or any other control unit.

The system may comprise an integrated device or one or more connected devices. Suitable systems for playing and/or displaying the image file may include computers or may include televisions and televisions operated in conjunction with a media player such as a DVD player, games console or television signal decoder or through a mobile technology device According to a seventh aspect of the present invention there is provided a system for providing additional information to viewers of a moving image comprising: reading means for reading the moving image content of said moving image and detecting the presence of one or more tags indicating the existence of associated information within the moving image; display means operable to display the moving image content of the moving image and to display a visual indication of the existence of said tags alongside or over the moving image; viewer actuable means for requesting the display of information associated with said one or more tags wherein in response to the viewer actuable means the display means is operable to display the requested information over the paused and/or moving image.

The system of the seventh aspect of the present invention may incorporate any or all features of the first six aspects of the present invention as desired or as appropriate.

In order that the invention is more clearly understood, it will be described in greater detail below, by way of example only, and with reference to the accompanying drawings in which.

In our prior invention described in PCT/GB2008/000706 a method is provided by means of which a viewer of a moving image (typically a film or computer game or television programme) may gain information upon and if desired purchase products and/or items and/or services seen in the moving and/or paused image. In the method of the invention a moving image is displayed on a display unit and the viewer is provided with a suitable control means. The moving image contains one or more tags indicating the existence of additional product information and/or items and/or services. The existence of said tags is displayed to the viewer along with the moving image in response to a viewer selection, request or action. The viewer may then request the display of said information and if so minded, order the associated products and/or items and/or services.

Figure 1:
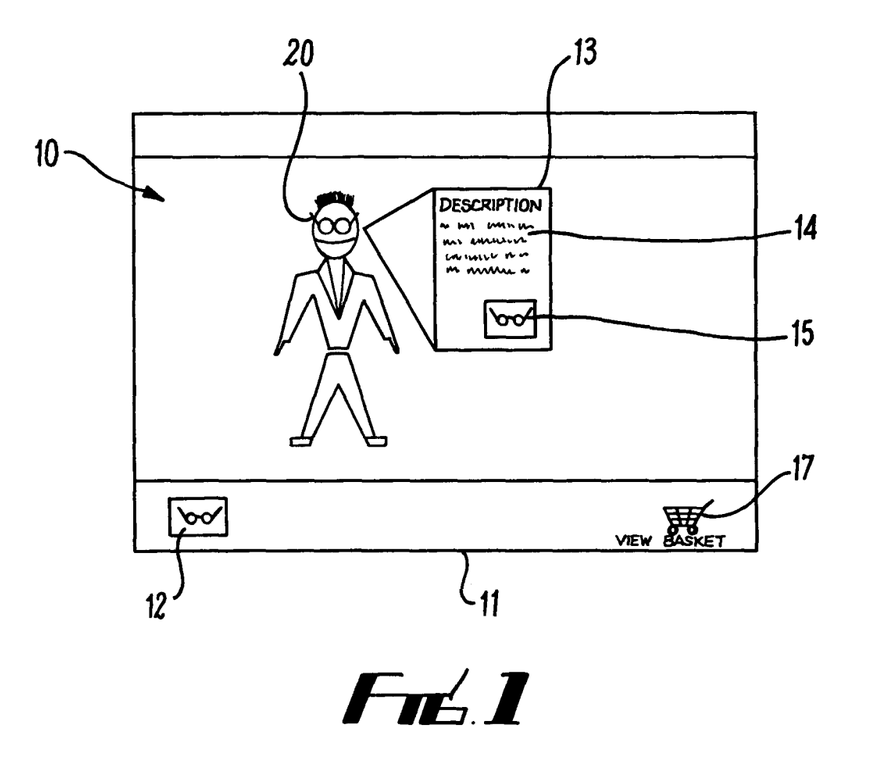
FIG. 1 illustrates the display of information about a featured product in an exemplary scene from a moving image as it is displayed in an implementation of our prior invention described in our co-pending international application no PCT/GB2008/000706.

Turning now to FIG. 1, an exemplary frame 10 from a moving image is displayed on the display device. The exemplary frame 10 is displayed with an icon bar 11 at the bottom of the image, which need not necessarily be displayed in some alternative embodiments. If the tag visual indication display mode is not selected, the image is displayed in the same manner as a conventional image. The tag visual indication display mode can be temporary or can persist until the viewer selection is reversed. The selection may be made by actuating a suitable input on the control means. If a tagged item 20 appears within the scene, a selectable icon 12 is displayed on the icon bar. Typically, as is shown in respect of the spectacles in FIG. 1, the icon may be pictorially representative of the item 20 that it is associated with. This enables the viewer to identify the product and to distinguish between two or more icons if there are two or more tagged items present in the displayed scene. Additionally or alternatively, the item 20 may be highlighted either constantly or momentarily within the moving image. In one particular implementation, the item 20 is highlighted when the viewer scrolls a cursor over the image or over the area of the image where the product is positioned.

The icon 12 may be selected by use of the control means. This may be achieved by actuating a dedicated control input or inputs. Alternatively, if the control device is suitable (for instance, a computer mouse or similar), the viewer may directly select the product by scrolling a cursor over the item 20.

Upon selection, the image is paused and, as is illustrated in FIG. 1, information relating to the item 20 is displayed. The information may be displayed in a pop up window 13 provided over the paused and or moving image, perhaps proximate to the product, as shown. Alternatively, the information may be displayed in an information bar alongside the paused and or moving image. The information may include a description of the item qualities 14, one or more item images 15, the name of the manufacturer and the price. The information may additionally or alternatively relate to specific or general background, historical or educational data related in some way to the item or a person or company associated with the item.

The displayed information may also include a selectable purchase icon (not shown), perhaps in the form of a shopping cart. In the presently described implementation, the purchase icon appears if the viewer scrolls over either the icon 12 or the image 15 or operates a dedicated control input. The viewer may then select the purchase icon using the control means in any suitable manner. By selecting this purchase icon, the product is added to a customers shopping list. The viewer can review and edit their shopping list and proceed to purchase by selecting the shopping cart icon 17 displayed on the icon bar. Alternatively, the selection may be made by actuating a dedicated control input on the control means.

After adding the product to their shopping list, the viewer may choose to complete the purchase at this time or may choose to continue viewing the image and/or the viewer may choose and/or be directed to the associated advertising. Typically, this may be possible by selecting suitable onscreen icons or buttons or by operating a suitable input on the control means.

Figure 2:
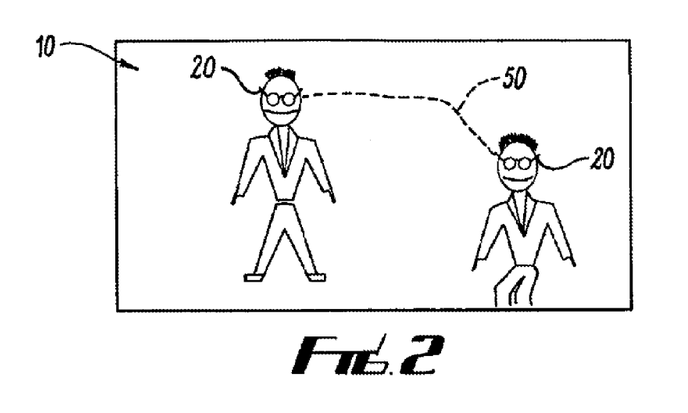
FIG. 2 illustrates schematically the motion of a selected item over the course of a scene in a moving image.

The present invention is concerned with a method of identifying the motion track of a selected item within a moving image. The method involves attaching one or more identification devices 30 to an item prior to shooting the moving image. In post production or in live streaming or broadcast, the object can then be recognised by way of the one or more identification devices 30. The successive positions of the identification device 30 within the frame may be plotted as a motion track 50, as is shown in FIG. 2. A tag may then be automatically applied to the motion path as the frame progresses. In the moving image, as viewed, the tag may be visible at all times or intermittently and/or in response to viewer request.

In order to reduce the number of false identifications of the identification device 30, identification from frame to frame within a selected shot may be constrained such that the device 30 can be determined to be located in a position adjacent or substantially adjacent to its position in the previous frame.

Figure 4:
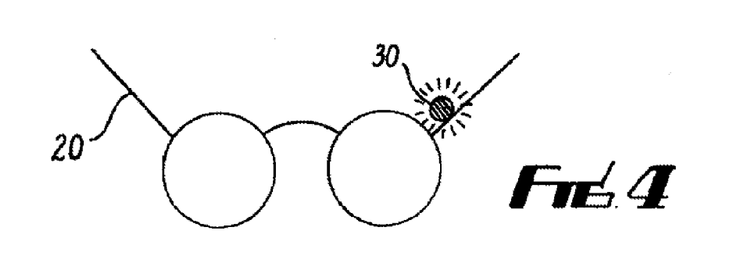
FIG. 4 is a schematic illustration of an identification device attached to a selected item before shooting a moving image.

An exemplary arrangement is shown in FIG. 4 where an identification device 30 is applied to an item 20 (as in the previous example, a pair of spectacles). The identification device has a distinctive element detectable by a suitable equipped moving image camera for identifying the identification device and enabling its position within a captured image to be determined. Typically this distinctive element is the appearance of the element at infrared or ultraviolet frequencies due to a monochromatic covering, a patterned covering or the continuous or intermittent emission of radiation. Alternatively, it may be a particular colour of visible light. In the event that the identification device is visible in the captured moving image and this detracts from the appearance of the moving image, it can be removed from the displayed image using suitable post production techniques.

Figure 5:
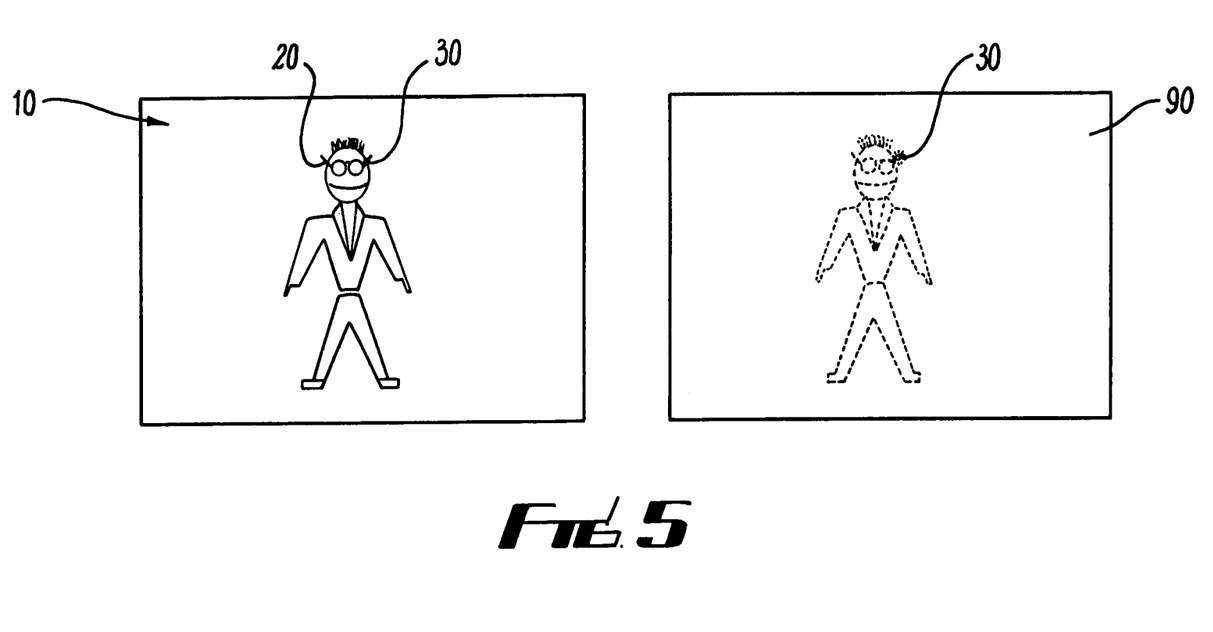
FIG. 5 is a schematic diagram of a dual image system according to the present invention for determining the position of the identification device and hence the selected item within an image frame.

In order to track the position and motion of the identification device 30 and hence the selected item 20 within the moving image, a specially adapted camera and/or specially adapted processing may be used. In such circumstances a conventional moving image 10 of the scene is captured in addition however a second image 90 of the scene is captured or generated. The second image 90 is adapted to preferentially show the identification device or devices present in the captured image. An illustrative image of first 10 and second 90 images side by side is shown in FIG. 5.

The second image 90 allows the position of the identification device 30 within the captured image to be determined and hence for a motion track 50 to be determined. The motion track 50 can then be tagged as above.

The second image 90 may be provided by digital filtering of the image produced by a conventional sensing array in the camera. The second image 90 may be generated by a second sensing array provided in addition to the conventional sensing array of the camera and subject to either physical or digital filtering. Additionally or alternatively, the second array may comprise sensing elements mounted adjacent to or intermingled with the sensing elements of the conventional sensing array.

In a further alternative arrangement, the or each identification device 30 may additionally or alternatively emit an RF signal. The RF signal may act to identify the identification device uniquely. It may also identify the distinctive properties of the device 30. In some arrangements, the RF signal may be used to locate the device within an image. In order to do so, two or more RF receivers may be connected to or incorporated into the camera capturing the image. The RF receivers can thus provide an estimate of the position of the device relative to the camera and hence an estimate of the position of the device within the image. In the event that the device is relatively far from the camera additional RF locator or relay stations may be provided. This enables the RF signal to be used to locate distant objects within a shot. Alternatively, the RF signal may be used to communicate information to the camera regarding the nature of or appearance of the device. This information can allow the device to be more rapidly recognised in post production and or live broadcast.

Figure 3:
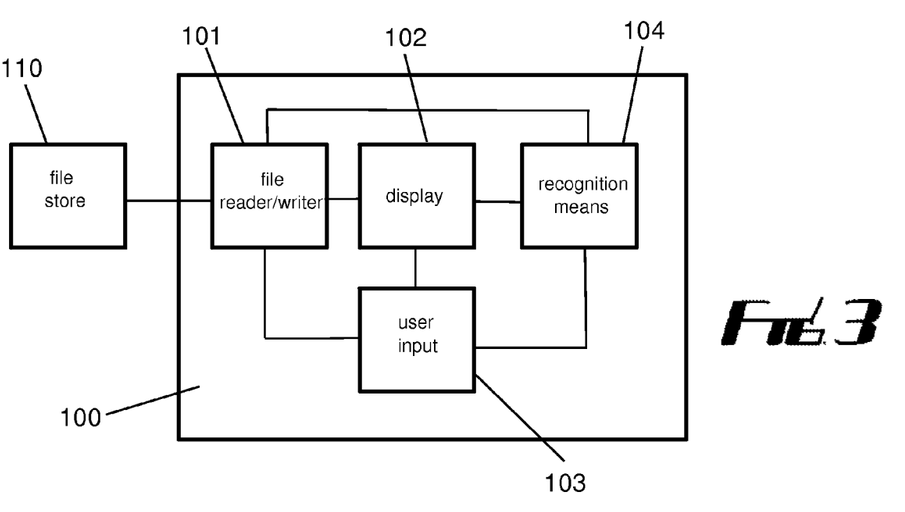
FIG. 3 is a schematic block diagram of a system for carrying out the method of the present invention.

The invention also provides a system 100 for enabling the above functionality and for enabling user control and or adjustment of the outcome of said method. A block diagram of such a system is shown in FIG. 3. The system comprises a file reader/writer 101 connected to a display means 102. The file reader/writer 101 is operable to read a moving image and control the display means 102 such that the image content of the file may be displayed to an operator. The file reader/writer 101 may also be operable to write an updated moving image incorporating tags and information associated with such tags. The read/written image file may be read from/written to a suitable file store 110 which can be any suitable form of data storage means including but not limited to magnetic drives and the like, integrated memory circuits (such as flash drives), tape based data storage means, optical discs such as CDs DVDs or similar or any other form of electrical, optical or magnetic data storage means. Alternatively, the file reader/writer 101 may be operable to receive and following processing transmit on live broadcast or streamed data.

The operation of reader/writer 101 and display 102 is controlled by suitable user input means 103. The user input means 103 may be any combination of suitable user input means including, but not limited to: one or more keys or key pads and/or a pointing device such as a trackball, touch screen, touch pad, joystick or computer mouse. In a preferred embodiment, the display 102 is a touch screen display and the input means 103 include one or more icons provided on screen. In such embodiments, an operator may initially select or identify the object by selecting or drawing around its outline using a suitable stylus.

The system further comprises recognition means 104 which are operable to recognise the identification devices 30 attached to selected items. The recognition means 104 are then operable to identify and locate the identification devices (and hence the selected items) in subsequent frames and thus to generate a motion track for the item through the shot A tag can then be applied to the track and the tag and track written to an updated moving image by reader writer 101.

Further possible embodiments of the aforementioned invention are related to its use in sports broadcasts, whether live or pre-recorded. The following example is illustrated using a ball based sport, however the invention can also be used for broadcasts relating to but not exclusive to such sports as motor racing, cycling, horse racing, sailing, boxing or the like. In general, the invention is useful for application to broadcasts of any sport, which may be enhanced by the tagging of contestants and/or product items for the purpose of displaying additional information and/or purchasing information and icons and or sponsors logos.

Figure 6A:
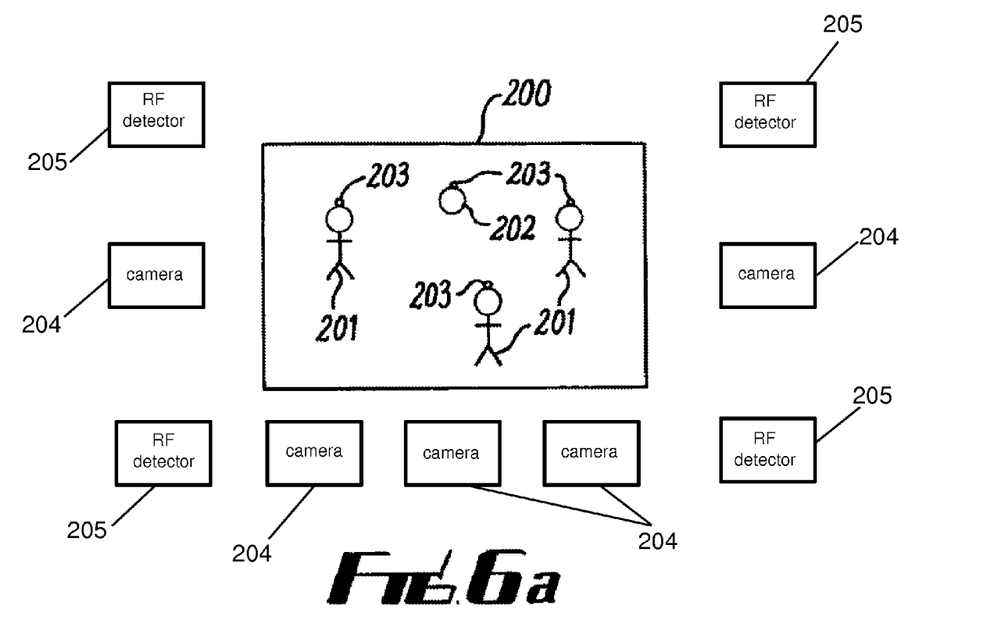
FIG. 6a is a schematic diagram of a sports pitch to illustrate the implementation of one embodiment of the present invention.
Figure 6B:
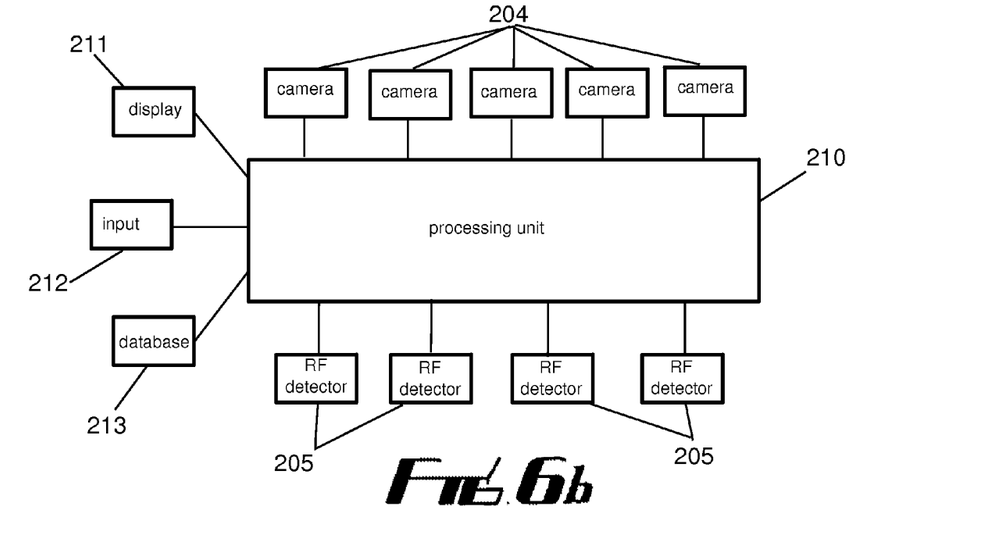
FIG. 6b is a schematic block diagram of a system for implementing the embodiment of FIG. 6.

Turing now to FIGS. 6a and 6b, a further possible embodiment is illustrated. In this embodiment, the invention is used to record footage of a sports event played on pitch 200 for broadcast. In the broadcast the players 201 and ball 202 are tagged. This enables the viewer to call up information related to the player, their specific performance in the match in question or their equipment or endorsements by selecting an associated tag in the manner described above.

In the embodiment of FIGS. 6a and 6b, the tagging is achieved by fitting one or more identification devices 203 to each player 201 and to the ball 202. The identification devices 203 may be fitted to the players clothing or in built into the ball 202. Each identification device 203 emits an RF signal which can be detected by RF detectors 205 placed around the pitch 200. By analysing the received signals it can thereby be determined where each player 201 and the ball 202 is at any one moment during the game.

Footage of the game is captured by one or more cameras 204 placed around the pitch. The positions of the cameras 204 are known. This can be achieved by placing cameras 204 in fixed positions relative to the pitch 200 prior to the game or by fitting the cameras 204 with tracking devices 203 such that their position can be tracked during the game. Additionally the direction in which the camera is pointed, its angle of inclination and its zoom settings are monitored.

In one preferred embodiment, at least some of the cameras 204 are provided in fixed positions and incorporate RF detectors. This can allow the suitably equipped cameras 204 to be utilised to implement the invention without the provision of separate RF detectors 205.

When all the above information is available a processing unit 210 can determine what parts of the pitch will be within the footage captured by each camera at any one time and where within the captured footage every position on the pitch will be seen. By combining this data with the player 201 and ball 202 position data it can be determined which players 201 (if any) and whether the ball 202 would be shown on the captured footage of each camera 204 and where within each frame of the footage that player 201 or ball 202 can be found. Accordingly, it is then possible to automatically tag one or more players 201 or the ball 202.

Figure 7:
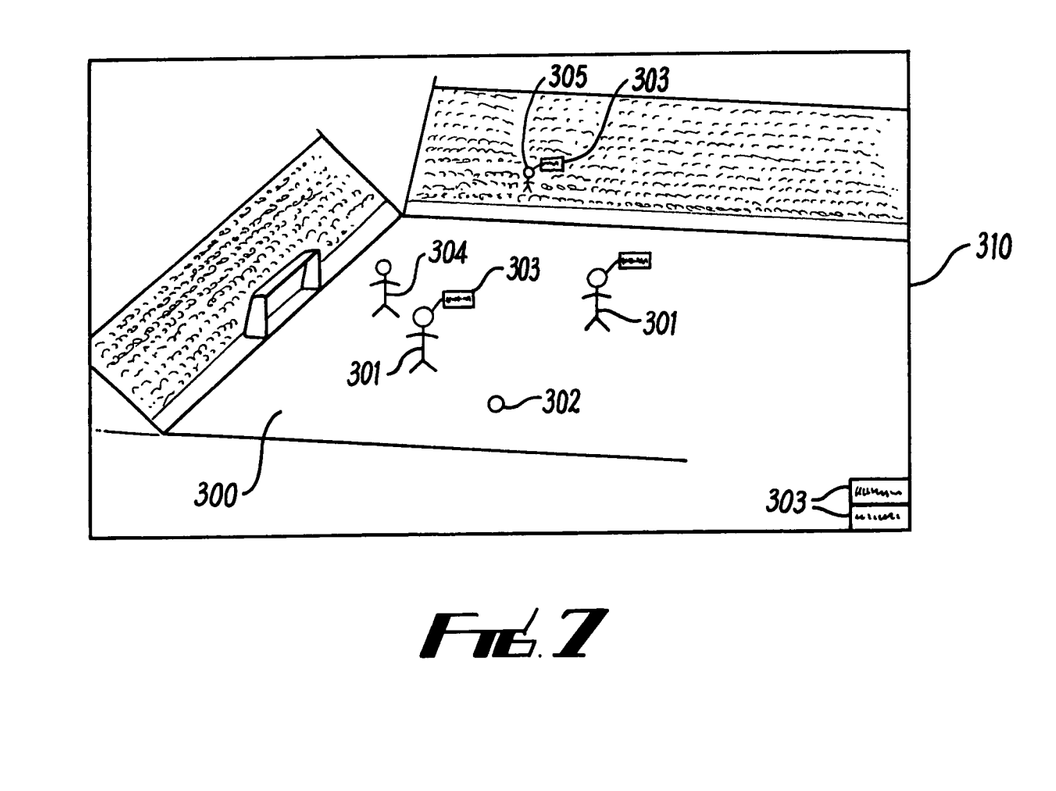
FIG. 7 shows a schematic screen shot of a football pitch wherein a number of players are identified by an associated tag in the form of a dialog box.

Whilst the present invention may be utilised to track ball or player movement, its primary purpose is to track the players or drivers or contestants in shot and allow the viewer to select a tag associated with a particular player. The associated tag can enable the display of statistics/information/sponsors logos or even allow a viewer to directly purchase a product or service associated with or promoted by the player and/or their sponsors. When the player then leaves shot or the camera cuts to another view that selected player's information tag will remain visible in one corner of the screen until the viewer deselects the tag. This is illustrated in FIG. 7, which shows schematically a screen shot 310 of a pitch 300 where a game of football is being observed by a large number of spectators in stands surrounding pitch 300. In this example, a viewer has decided to select tags associated with two players 301 in the shot 310, but has not selected player 304. The players 301 are thus automatically tagged with a dialogue box 303 indicating their identity and/or additional information. The viewer has also selected to track two players not currently in shot. Accordingly, the dialog boxes 303 associated with these players are displayed in the corner of the shot 310.

It is also possible that spectators at the event could purchase an identification device to be carried. This could enable their position to be tracked by a viewer. In this way a viewer at home may be able to see friends of theirs attending the match. In the example of FIG. 7, the viewer has also selected a tag associated with a spectator 305 and thus the spectator 305 is automatically identified by dialog box 303 when in shot. In order that this may be achieved, when purchasing or hiring an identification device, a spectator may upload identification or other details such as name/nickname or a message (for example "Hi Mum!", "Go on you reds!", "You're not singing anymore!" or alternatives, as appropriate) to an associated database. These details may be displayed in the dialog box.

In order to select which players/others to track a viewer may be able to access a selection menu. The selection menu may appear over, alongside or in place of the footage and may list all potentially tagable items or potentially tagable items by category. Additionally or alternatively, a spectator may be able to send a message to a viewer indicating that they can be tagged in coverage of the event. The message can be sent via the broadcast platform or separately, as desired.

Whilst the present invention may be utilised to track ball or player movement, its primary purpose is to track the players or drivers or contestants in shot and allow the viewer to select a tag associated with a particular player. The associated tag can enable the display of statistics/information/sponsors logos or even allow a viewer to directly purchase a product or service associated with or promoted by the player and/or their sponsors. When the player then leaves shot or the camera cuts to another view that selected players information tag will remain visible in one corner of the screen until the viewer deselects the tag.

In many sports only one ball may be in play at any one time but multiple balls may be provided such that play is not delayed unduly to retrieve balls that leave the pitch 200. In such cases, each ball 202 may be provided with a separate identification device and the processing unit 210 may apply a suitable algorithm to determine which ball is currently in play. Once a ball is identified as being in play, the algorithm may continue to identify that ball 202 as being in play until the ball 202 leaves the pitch 200. If no ball 202 is identified as being in play, the algorithm may determine the position of all balls 202. If only one is located on the pitch, the algorithm may identify that ball 202 as being in play. If no balls are located on the pitch 200, the algorithm may compare the position of all the balls to the positions of players 201. If a ball is located at the same location as or substantially adjacent to a player 201 outside the pitch, this ball 202 can be identified as being in play. This situation might correspond to a player having been forced out of play when in possession of the ball 202 or a subsequent restart such as a throw in football or a line out in rugby.

The processing device may be connected to a display unit 211 operable to display the images captured by one or more cameras 204 and the locations of the or each identification device 203 therein. A user may then select which identification devices 203 are to be tagged in the broadcast. This can be achieved by suitable user input controls 212, including, but not limited to: one or more keys or key pads and/or a pointing device such as a trackball, touch screen, touch pad, joystick or computer mouse.

The information shown when a tag is selected may be drawn from a dedicated database 213. Additionally or alternatively, some of the data may be derived from location data determined by the processing unit 210. For instance, the processing unit may be operable to provide information as to the distance moved, speed of movement or typical location of the players 201 or the ball in play 202.

Whilst the above embodiment has been described in connection with live coverage of a sporting event, there is no reason why it may not be applied to live coverage of any other event or indeed to pre-recorded coverage of an event or shooting single scenes of any other type.

Furthermore, whilst the above embodiment has been described primarily in terms of RF implementation, in some circumstances embodiments using visual, IR or UV identification devices and suitably equipped cameras may be used. These implementations may be particularly suited to sporting events having individual equipment rather than a team uniform. In such cases, each player may have an item of clothing or equipment suitably adapted to display or emit a distinctive IR, UV or visual signature. As illustrative but non limiting examples, one could cite, jockey's silks, driver's helmets, swimmer's caps or trunks amongst many more.

Other illustrative, but non-limiting examples of use of the above are in relation to civic events such as parades or carnivals, or mass participation events such as marathons or fun runs where participants or spectators may choose to carry an identification device.

It is of course to be understood that the invention is not to be restricted to the details of the above embodiment which is described by way of example only.

The invention claimed is:

1. A method of visibly tagging the position of items appearing in a moving image comprising the steps of:
providing an identification device on or within each said item to be visibly tagged;
capturing moving image footage which may contain the image of one or more of said items to be tagged using one or more image capture devices, said moving image footage comprising a plurality of successively captured moving image frames;
determining the position of the image capture devices;
determining the position of the identification device;
determining the relative position of the image capture devices and the identification device and hence determining whether the item to be visibly tagged is in each of said plurality of successively captured moving image frames of the moving image footage and if so, determining the relative position of the item within each frame, and contemporaneously applying a visible tag to the determined position of the item within each of said plurality of successively captured moving image frames,
wherein said step of contemporaneously applying a visible tag includes plotting a motion path of the determined position of the item within said successively captured moving image frames and automatically applying said tag to said motion path,
wherein the position of the identification device is determined using tracking devices which are incorporated into the image capture devices or provided separately, and
wherein the tracking devices are provided at fixed predetermined positions in or around the area where moving image footage is to be captured and wherein the identification device is operable to emit an RF signal that can be received by the tracking devices.

2. A method as claimed in claim 1 wherein the position of said image capture devices is predetermined or is tracked.

3. A method as claimed in claim 1 wherein the orientation and/or inclination of said image capture devices is predetermined or tracked.

4. A method as claimed in claim 3 wherein tracking of the position of said image capture devices is achieved by fitting each image capture device with an identification device.

5. A method as claimed in claim 1 wherein if more than one identification device is provided, each identification device is provided with a unique identity code.

6. A method as claimed in claim 1 wherein the identification devices are adapted to be concealed in clothing or other equipment when desired.

7. A method as claimed in claim 1 wherein the identification device is operable to receive external signals and transmit information relating thereto to the tracking device.

8. A method as claimed in claim 7 wherein the identification device is adapted to use an existing position determination system, such as GPS, to determine its own position or to provide sufficient information for the tracking device to determine its position.

9. A method as claimed in claim 1 wherein the image capture device comprises a camera such as a digital or analogue movie or television camera.

10. A method as claimed in claim 1 wherein if the identification device detracts from or is otherwise visible in the captured moving image file after tagging is complete, suitable post production techniques are applied to remove visible traces of the identification device from the finalized moving image file.

11. A method of providing additional information to a viewer of a moving image comprising the steps of:
determining whether one or more items to be tagged are in a frame of a moving image and if so, their position within that frame using the method of claim 1;
indicating the existence of said tags;
detecting a request to view said information associated with said one or more tags; and displaying said requested information over said moving image.

12. A system suitable for visibly tagging the position of items appearing in a moving or paused image, the system comprising:
- an identification device on or within each item to be visibly tagged;
- a plurality of image capture devices configured and arranged to capture moving image footage which may contain the image of one or more item to be visibly tagged, said moving image footage comprising a plurality of successively captured moving image frames;
- a tracking system including a plurality of tracking devices configured and arranged to detect the presence and the position of each identification device within each frame of the moving image footage and hence determining the position of the item to be visibly tagged in each frame of the moving image,
- wherein the tracking system is further configured and arranged to detect the position of the image capture devices;
- wherein the tracking system is still further configured and arranged to determine the relative position of the image capture devices and the identification device and hence determining whether the item to be visibly tagged is in each of said plurality of successively captured moving image frames of the moving image footage and, if so, determining the relative position of the item within each frame, and contemporaneously applying a visible tag to the determined position of the item within each of said plurality of successively captured moving image frames; and
- an object recognition system configured and arranged to visibly track the motion path of the item within said successively captured moving image frames,
- wherein the tracking system and the object recognition system are cooperative for plotting a motion path of the determined position of the item within said successively captured moving image frames and automatically applying said tag to said motion path,
- characterized in that the tracking devices are either incorporated into the image capture devices or provided separately,
- said tracking devices being provided at fixed predetermined positions in or around the area where moving image footage is to be captured and
- wherein the or each identification device is operable to emit an RF signal that can be received by the tracking devices.

13. A system as claimed in claim 12 wherein two or more RF receivers are provided to track the position of said one or more identification device.

14. A system as claimed in claim 13 wherein one or more RF booster or relay stations are provided to enable the devices to be recognized and located at a long range.

15. A system as claimed in claim 12 wherein the image capture devices are provided with one or more sensors to determine inclination, orientation and extent of its field of view.

16. A system as claimed in claim 12 further comprising a processing unit which is operable to determine the position of the identification means within each frame of the moving image footage, wherein the processing unit is in communication with each image capture device and each tracking device.

17. A system as claimed in claim 16 wherein the processing unit is provided with user actuable controls which enable a user to select which of a possible plurality of identification devices are to be visibly tagged in the moving images and/or enable the information associated with any visible tagging to be varied.

18. A system as claimed in claim 17 wherein the information associated with any tagging is retrieved from a dedicated database or is generated by the processing unit.

19. A system as claimed in claims 12 wherein the system further comprises:
- a display device configured and arranged to display said captured moving image footage and indicate the presence of visibly tagged items in the displayed captured image footage; and
- a user actuable input configured and arranged to enable the selection and visible tagging of an indicated item.

* * * * *